(12) United States Patent
Shimono et al.

(10) Patent No.: US 10,688,736 B2
(45) Date of Patent: Jun. 23, 2020

(54) COMPOSITE MATERIALS MOLDING METHOD, AND COMPOSITE MATERIALS

(71) Applicants: MITSUBISHI HEAVY INDUSTRIES, LTD., Minato-ku, Tokyo (JP); TORAY INDUSTRIES, INC., Chuo-ku, Tokyo (JP)

(72) Inventors: Kodai Shimono, Tokyo (JP); Hiroshi Tokutomi, Tokyo (JP); Kensuke Kokumai, Aichi (JP); Yusuke Yamagishi, Aichi (JP)

(73) Assignees: MITSUBISHI HEAVY INDUSTRIES, LTD., Tokyo (JP); TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/751,772

(22) PCT Filed: Dec. 2, 2016

(86) PCT No.: PCT/IB2016/057288
§ 371 (c)(1),
(2) Date: Feb. 9, 2018

(87) PCT Pub. No.: WO2017/060892
PCT Pub. Date: Apr. 13, 2017

(65) Prior Publication Data
US 2018/0257317 A1 Sep. 13, 2018

(30) Foreign Application Priority Data
Oct. 6, 2015 (JP) .................................. 2015-198680

(51) Int. Cl.
*B29C 70/48* (2006.01)
*B29D 99/00* (2010.01)
(Continued)

(52) U.S. Cl.
CPC .............. *B29C 70/48* (2013.01); *B29C 53/04* (2013.01); *B29C 70/06* (2013.01);
(Continued)

(58) Field of Classification Search
CPC ....... B29C 70/48; B29C 70/345; B29C 53/04; B29D 99/0014
See application file for complete search history.

(56) References Cited

U.S. PATENT DOCUMENTS 4,606,961 A * 8/1986 Munsen .................. B29C 70/08
428/105
8,864,076 B2 * 10/2014 Wood ...................... B29C 70/30
244/123.1
(Continued)

FOREIGN PATENT DOCUMENTS

| | | |
|---|---|---|
| CA | 2691165 A1 | 1/2009 |
| CN | 101007568 A | 8/2007 |

(Continued)

OTHER PUBLICATIONS

International Search Report and Written Opinion in PCT/IB2016/057288, dated Jan. 17, 2017. 11pp.
(Continued)

*Primary Examiner* — Matthew J Daniels
(74) *Attorney, Agent, or Firm* — Hauptman Ham, LLP (57) ABSTRACT

A method of molding composite materials including shaping a laminate having fiber sheets laminated over one another, by bending the laminate in an X-direction and a Y-direction, in a three-dimensional orthogonal coordinate system. The method further includes mounting the laminate that has been shaped, onto a mold material deformed in a Z-direction, impregnating a resin material into the laminate while adjusting an amount of the resin material filled in, and molding the composite materials that have cured such that the composite (Continued)

materials are shaped to have a first inclined surface inclined at a first inclination angle with respect to a reference plane in the Z-direction. The mold material has a first inclination molding surface that molds the first inclined surface, and a second inclination molding surface that molds a surface of the composite materials into a second inclined surface having a second inclination angle smaller than the first inclination angle.

5 Claims, 4 Drawing Sheets

(51) Int. Cl.
    *B29C 70/06*     (2006.01)
    *B29C 53/04*     (2006.01)
    *B32B 5/26*     (2006.01)
    *B29L 31/00*     (2006.01)
    *B29K 307/04*     (2006.01)

(52) U.S. Cl.
    CPC ............ *B29D 99/0007* (2013.01); *B32B 5/26* (2013.01); *B29K 2307/04* (2013.01); *B29L 2031/001* (2013.01); *B32B 2262/106* (2013.01)

(56) References Cited

U.S. PATENT DOCUMENTS

| | | | | |
|---|---|---|---|---|
| 2007/0066717 A1* | 3/2007 | Nazri | ............ | B82Y 30/00 523/200 |
| 2008/0023583 A1 | 1/2008 | Payen | | |
| 2010/0178453 A1* | 7/2010 | Wood | ............ | B29C 70/30 428/119 |
| 2012/0076973 A1 | 3/2012 | Guzman et al. | | |
| 2012/0119030 A1 | 5/2012 | Edelmann et al. | | |
| 2012/0196083 A1 | 8/2012 | Hanawa et al. | | |
| 2014/0103585 A1 | 4/2014 | Coxon et al. | | |
| 2014/0353876 A1* | 12/2014 | Murai | ............ | B29C 70/48 264/331.11 |

FOREIGN PATENT DOCUMENTS

| | | |
|---|---|---|
| CN | 103402739 A | 11/2013 |
| CN | 104718065 A | 6/2015 |
| JP | H06207345 A | 7/1994 |
| JP | 2007-15351 A | 1/2007 |
| JP | 2010-531777 A | 9/2010 |
| WO | 2009004364 A2 | 1/2009 |
| WO | 2011/046137 A1 | 4/2011 |

OTHER PUBLICATIONS

Office Action for Canadian Application No. 2,995,321 dated Jun. 17, 2019, 4 pp.
Office Action for Chinese Application No. 201680050925.4 dated Aug. 22, 2019; 11pp.
Office Action for Chinese Application No. 201680050925.4 dated Aug. 2, 2019; 11pp.

\* cited by examiner

COMPOSITE MATERIALS MOLDING METHOD, AND COMPOSITE MATERIALS

RELATED APPLICATIONS

The present application is a National Phase of International Application Number PCT/IB2016/057288, filed Dec. 2, 2016, which claims priority to Japanese Application No. 2015-198680 filed Oct. 6, 2015

FIELD

The present invention relates to a composite materials molding method, and composite materials.

BACKGROUND

Conventionally, a plate thickness correction tool for reduction of a molding defect at a corner portion having an L-shaped or C-shaped cross section has been known (see, for example, Patent Literature 1). This plate thickness correction tool is placed over composite materials, which have been shaped so as to have an L-shaped or C-shaped cross section, and the plate thickness correction tool is made of a material having flexibility at a temperature lower than a heat curing temperature of the composite materials. The plate thickness correction tool uniformly maintains plate thickness of the composite materials with elastic force of elastic deformation in a state that the plate thickness correction tool is placed over the composite materials even after the composite materials cured.

CITATION LIST

Patent Literature

Patent Literature 1: Japanese Unexamined Patent Application Publication No. 2007-15351 A

SUMMARY

Technical Problem

As described in Patent Literature 1, when the composite materials are shaped, a laminate having fiber sheets laminated over one another is two-dimensionally bent into a predetermined shape in a cross section orthogonal to a sheet surface thereof. Further, after being bent two-dimensionally, the laminate may be bent into a predetermined shape in a cross section orthogonal to the two-dimensional cross section thereof. That is, the laminate may be three-dimensionally bent into a predetermined shape in a three-dimensional space. When the laminate is bent three-dimensionally, wrinkles, where the fiber sheets forming the laminate meander, tend to be generated. Therefore, since the laminate needs to be made into a predetermined shape that reduces the formation of wrinkles, when the laminate is bent three-dimensionally, freedom of design for the composite materials is decreased.

Thus, an object of the present invention is to provide a composite materials molding method and composite materials, which enable generation of wrinkles to be reduced.

Solution to Problem

A method of molding composite materials according to the present invention to be joined to a skin having a panel shape inclined at a first inclination angle with respect to an XZ plane from a Z-axis in a Y-direction in a three-dimensional orthogonal coordinate system includes a shaping process of shaping a laminate having fiber sheets laminated over one another, by bending the laminate in an X-direction and the Y-direction such that a cross sectional shape of the laminate becomes the same along a Z-direction, and a molding process of mounting the laminate that has been shaped, onto a mold material having a change in shape from the Z-axis in the Y-direction, impregnating a resin material into the laminate while adjusting an amount of the resin material filled therein, and molding the composite materials that have cured into a shape having a first inclined surface inclined at the first inclination angle with respect to the XZ plane from the Z-axis in the Y-direction, such that the composite materials that have cured have a shape complementary to the panel shape of the skin. The mold material has a first inclination molding surface that molds the first inclined surface and serves as a joint surface to the skin, and a second inclination molding surface that molds a surface of the composite materials, the surface being opposite to the first inclined surface, into a second inclined surface having a second inclination angle smaller than the first inclination angle.

According to this configuration, even if the laminate is bent three-dimensionally, by molding the composite materials that have cured such that the first inclined surface and the second inclined surface are formed therein, generation of wrinkles is able to be reduced. That is, since the second inclination molding surface that molds the second inclined surface of the composite materials is an inclined surface that is more moderate than the first inclination molding surface, wrinkles according to the second inclined surface will be formed. Since the wrinkles formed according to the second inclined surface are able to be made into wrinkles smaller than wrinkles formed according to the first inclined surface, generation of wrinkles is able to be reduced. As the generation of wrinkles is able to be reduced, restriction on shape of the composite materials is mitigated, and for example, the first inclination angle of the first inclined surface is able to be made an angle larger than that done conventionally. Therefore freedom of design of the composite materials is able to be increased. The fiber sheets may be dry or may be a prepreg formed by impregnation of resin. Further, the mold material may be: a mold made by use of metal, such as aluminum or Invar; a common material that is the same material as those of the composite materials to be molded; or a mold material made by use of a bonded material that has cured.

Further, it is preferable that the fiber sheets are in a dry state.

According to this configuration, a state where interlayer slippage in the laminate easily occurs is achieved. Therefore, since a structure, which easily allows displacement of the laminate that is bent three-dimensionally, is able to be made, generation of wrinkles is able to be reduced even more.

Further, it is preferable that, in the molding process, a fiber volume content of an inclined part that is a part where the first inclined surface is formed is smaller than a fiber volume content of an adjacent part that is a part adjacent to the inclined part.

According to this configuration, since the interposure of the laminate at the first inclination molding surface is mitigated, the resin material is able to be more easily filled into the inclined part as compared to the adjacent part, and the fiber volume content of the inclined part is decreased. Therefore, molding is able to be achieved with the plate thickness of the inclined part being made thicker than the plate thickness of the adjacent part.

Further, it is preferable that, in the molding process, the composite materials are molded, such that a plate thickness of the composite materials that has cured becomes thinner than a plate thickness of the composite materials that have not cured.

According to this configuration, by discharge of the excessive resin material filled into the laminate outside, the plate thickness of the composite materials that have cured is able to be made thinner than the plate thickness of the composite materials that has not cured. Therefore, by adjustment of the amount of resin material filled in, the first inclined surface and the second inclined surface of the composite materials are able to be molded, and thus molding of the composite materials by use of the mold material is able to be carried out accurately.

Further, it is preferable that, in the molding process, the composite materials are molded, such that an increase in fiber volume content of the composite materials that have cured is equal to or less than 20% of a fiber volume content of the composite materials that have not cured.

According to this configuration, even if the fiber volume content changes for molding of the first inclined surface and second inclined surface, by the composite materials being molded such that the increase in the fiber volume content is equal to or less than 20%, reduction in strength of the composite materials is able to be lessened. More preferably, the composite materials are molded such that the increase in the fiber volume content of the composite materials that have cured is in a range of about 5% to 10% of the fiber volume content of the composite materials that have not cured.

A composite materials according to the present invention change in shape in an X-direction, a Y-direction, and a Z-direction, in a three-dimensional orthogonal coordinate system, and have a shape having a first inclined surface that is inclined at a first inclination angle with respect to a reference plane, and a second inclined surface that is a surface opposite to the first inclined surface and that has a second inclination angle smaller than the first inclination angle.

According to this configuration, by molding of the first inclined surface and the second inclined surface, a shape with the generation of wrinkles reduced is able to be made. Thus, as the generation of wrinkles is able to be reduced, restriction on the shape is mitigated, and for example, the first inclination angle of the first inclined surface is able to be shaped into an angle larger than that done conventionally. Therefore, the composite materials high in freedom of design are able to be shaped.

Further, it is preferable that a fiber volume content of an inclined part that is a part where the first inclined surface is formed is smaller than a fiber volume content of an adjacent part that is a part adjacent to the inclined part.

According to this configuration, since it becomes easier for the resin material to be filled into the inclined part, as compared to the adjacent part, the fiber volume content of the inclined part is decreased. Therefore, molding is able to be achieved with the plate thickness of the inclined part being made thicker than the plate thickness of the adjacent part.

DESCRIPTION OF EMBODIMENTS

Hereinafter, embodiments according to the present invention will be described in detail, based on the drawings. The present invention is not limited by these embodiments. Further, components in the following embodiments include any component that is easily substitutable by those skilled in the art or any component that is substantially the same. Furthermore, the components described below may be combined with one another, as appropriate, and when there are plural embodiments, any of the embodiments may be combined with one another.

Embodiments

A molding method for composite materials 1 according to this embodiment is a method for the composite materials 1 to be molded, the composite materials 1 constituting, for example, an airframe or the like of an aircraft. The composite materials 1 may be, for example, a spar 10 illustrated in FIG. 1, a stringer 20 illustrated in FIG. 2, or the like. Description will be made with the embodiment being applied to the composite materials 1 illustrated in FIG. 1 and FIG. 2, but the embodiment is not limited to these composite materials 1.

Figure 1:
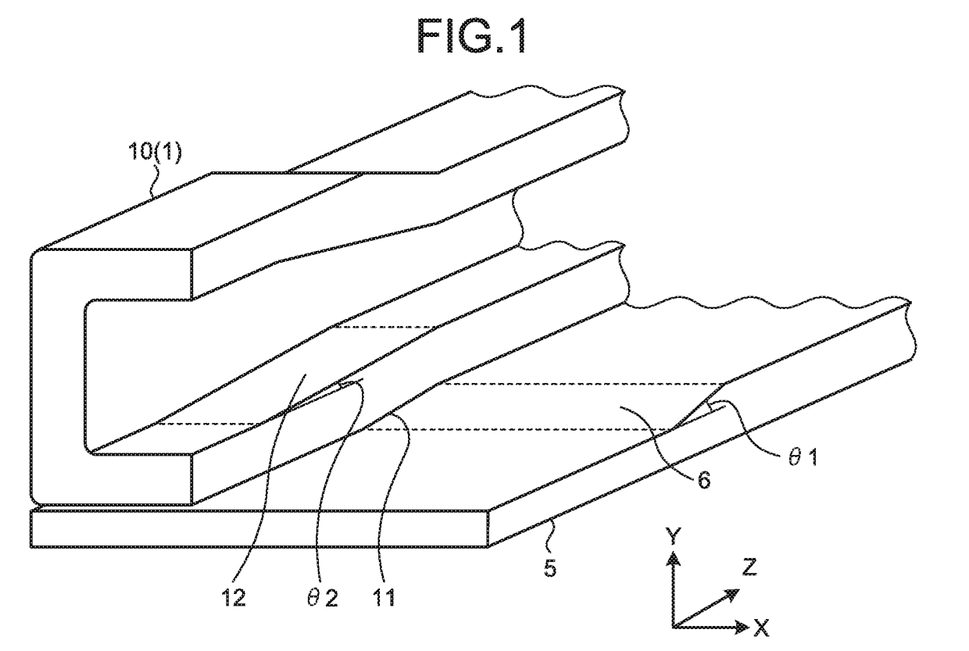
FIG. 1 is a perspective view illustrating a spar, which is an example of composite materials molded by a composite materials molding method according to an embodiment.
Figure 2:
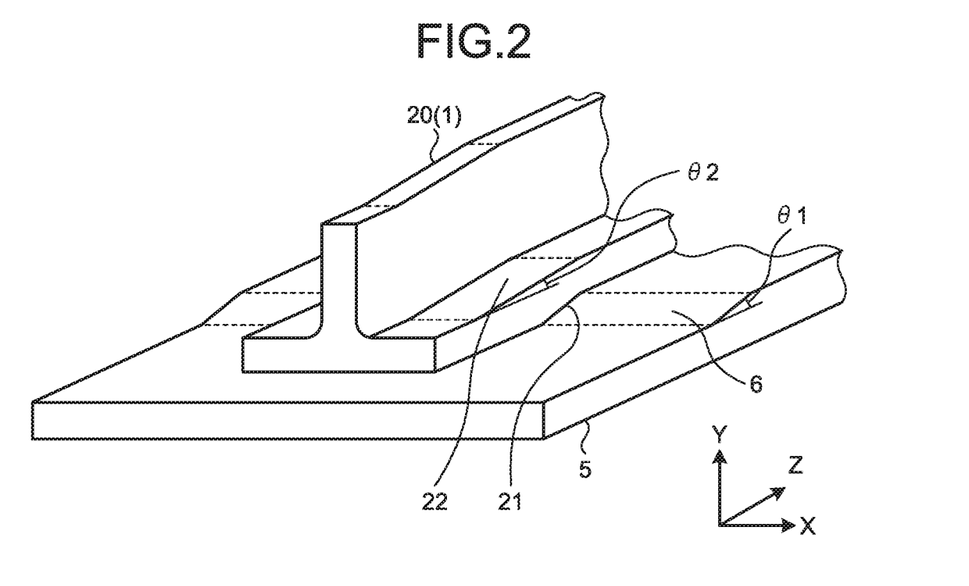
FIG. 2 is a perspective view illustrating a stringer, which is another example of the composite materials molded by the composite materials molding method according to the embodiment.
Figure 3:
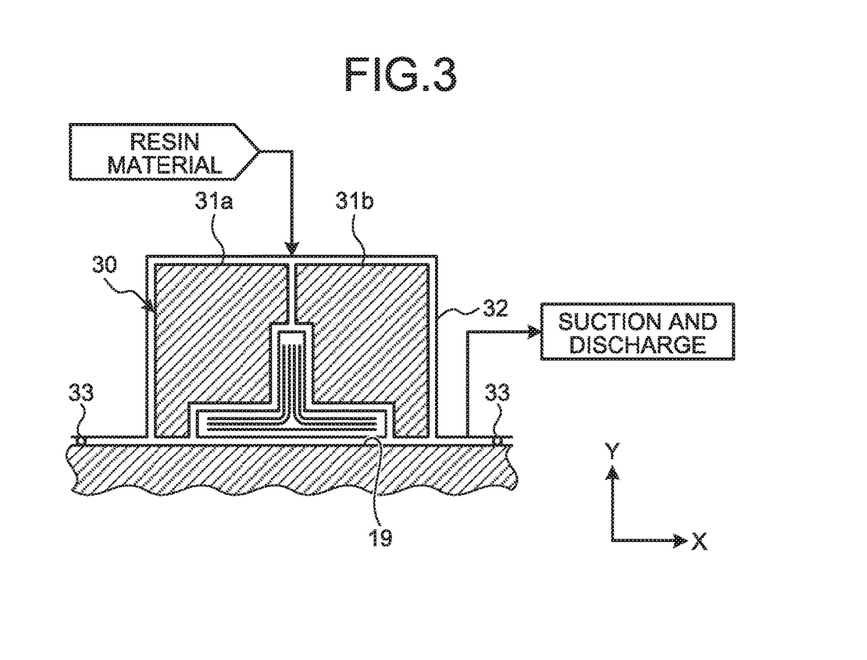
FIG. 3 is an explanatory diagram related to the composite materials molding method according to the embodiment.
Figure 4:
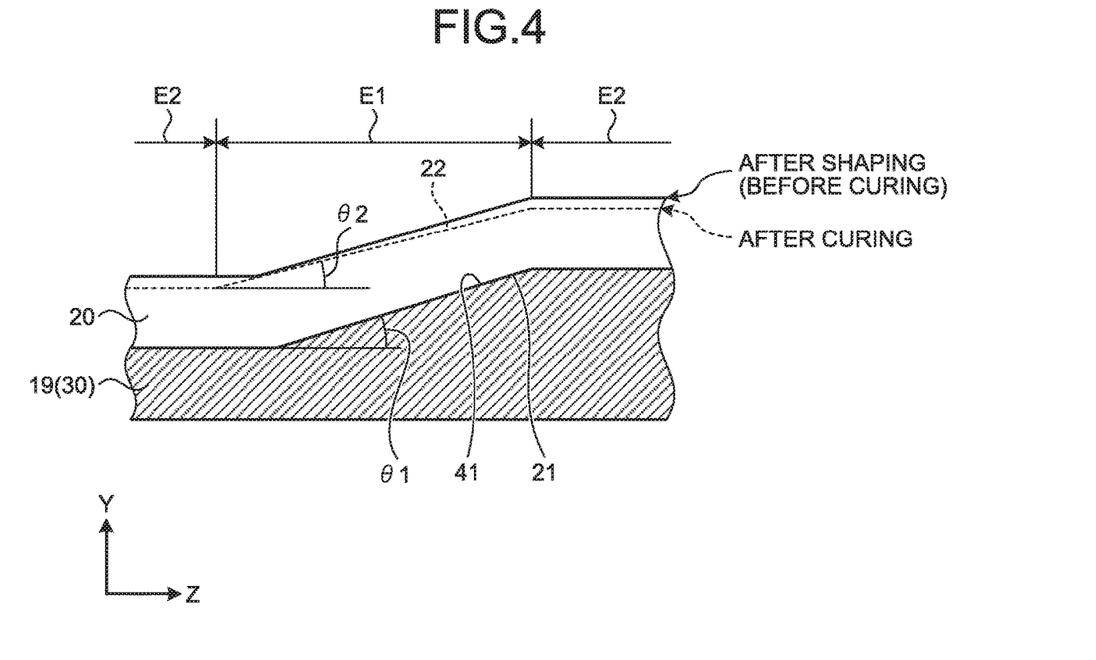
FIG. 4 is an explanatory diagram related to shapes of the composite materials having cured and not cured.
Figure 5:
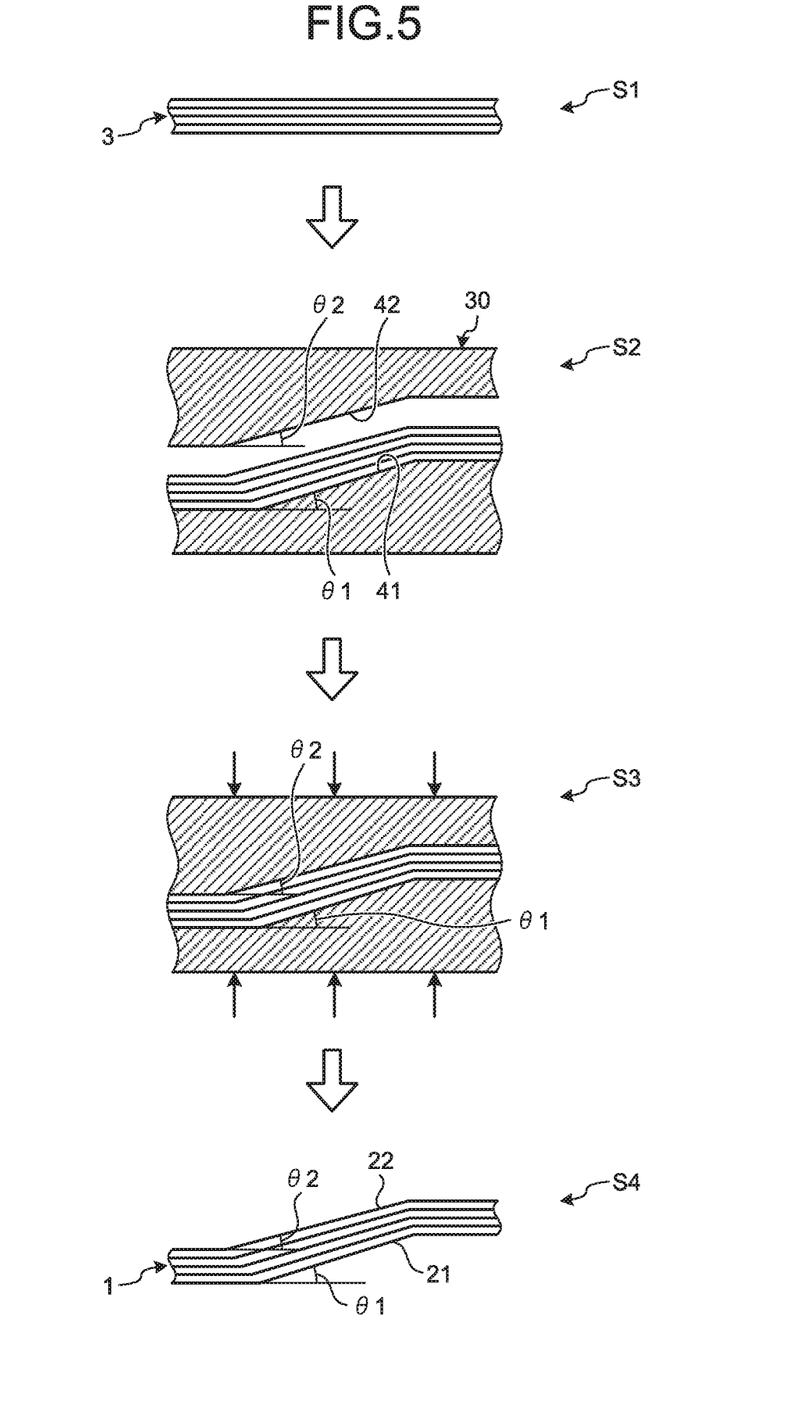
FIG. 5 is an explanatory diagram illustrating operation of the composite materials molding method according to the embodiment.

FIG. 1 is a perspective view illustrating a spar, which is an example of composite materials molded by a composite materials molding method according to the embodiment. FIG. 2 is a perspective view illustrating a stringer, which is another example of the composite materials molded by the composite materials molding method according to the embodiment. FIG. 3 is an explanatory diagram related to the composite materials molding method according to the embodiment. FIG. 4 is an explanatory diagram related to shapes of the composite materials having cured and not cured. FIG. 5 is an explanatory diagram illustrating operation of the composite materials molding method according to the embodiment.

Before description of the molding method for the composite materials 1; by reference to FIG. 1 and FIG. 2, the composite materials 1 molded by this molding method will be described. The composite materials 1 illustrated in FIG. 1 and FIG. 2 are formed by use of carbon fiber reinforced plastic (CFRP). These composite materials 1 are each molded by: formation of a laminate 3 (see FIG. 5) by lamination of plural carbon fiber sheets; and impregnation of resin into this laminate 3 and curing thereof. The composite materials 1 are mounted on a mounted member 5. The mounted member 5 is, similarly to the composite materials 1, CFRP, and as illustrated in FIG. 1 and FIG. 2, a ply drop-off portion 6 is formed in the mounted member 5. The ply drop-off portion 6 has an inclined surface formed thereon, by removal of a portion of the laminated carbon fiber sheets. When a flat surface at a lower side of and adjacent to the ply drop-off portion 6 is referred to as a reference plane, this inclined surface is inclined at a predetermined inclination angle θ1 with respect to the reference plane. Therefore, a first inclined surface is formed in a contact surface of the composite materials mounted on the mounted member 5, the contact surface coming into contact with the ply drop-off portion 6 of the mounted member 5, the first inclined surface having a shape complementary to that of the inclined surface of the ply drop-off portion 6. That is, the first inclined surface is inclined at the predetermined inclination angle θ1 with respect to the reference plane. When the composite materials 1 having the first inclined surface are molded;

as illustrated in FIG. 1 and FIG. 2, the composite materials 1 are molded to be changed in shape in an X-direction, a Y-direction, and a Z-direction, in a three-dimensional orthogonal coordinate system.

As illustrated in FIG. 1 and FIG. 2, when the composite materials 1, which are changed in shape in the X-direction, Y-direction, and Z-direction in the three-dimensional orthogonal coordinate system, are molded, the laminate 3 is shaped by being bent three-dimensionally. Specifically, the laminate 3 is two-dimensionally bent by being bent in the X-direction or Y-direction, such that the laminate 3 is made to have the same cross-sectional shape along the Z-direction. For example, for the spar 10 illustrated in FIG. 1, the laminate 3 is bent perpendicularly to an XZ plane in the Y-direction, and further bent perpendicularly to a YZ plane in the X-direction. Further, for the stringer 20 illustrated in FIG. 2, the laminate 3 is bent such that a cross section thereof becomes T-shaped in an XY plane. Furthermore, after being bent two-dimensionally, the laminate 3 is three-dimensionally bent into a predetermined shape in the YZ plane orthogonal to the XY plane. For example, for the spar 10 illustrated in FIG. 1, the laminate 3 is bent, such that both of opposite end portions that have been bent in the XY plane are deformed in mutually approaching directions in the YZ plane. Moreover, for the stringer 20 illustrated in FIG. 2, the laminate 3 is bent such that height thereof in the YZ plane is displaced.

As illustrated in FIG. 1, by being molded by use of a predetermined mold, the laminate 3 that has been shaped as described above is molded into the spar 10 having a shape with a first inclined surface 11. Although details will be described later, in this spar 10, a surface opposite to the first inclined surface 11 is a second inclined surface 12, and this second inclined surface 12 is inclined at a predetermined inclination angle θ2 with respect to the above described reference plane. The inclination angle θ2 is an angle smaller than the inclination angle θ1.

Further, as illustrated in FIG. 2, by being molded by use of a predetermined mold, the laminate 3 that has been shaped as described above is molded into the stringer 20 having a shape with a first inclined surface 21. Although details will be described later, in this stringer 20 also, a surface opposite to the first inclined surface 21 is a second inclined surface 22, and this second inclined surface 22 is inclined at a predetermined inclination angle θ2 with respect to the above described reference plane. The inclination angle θ2 is an angle smaller than the inclination angle θ1.

Next, by reference to FIG. 3 to FIG. 5, the composite materials molding method will be described. This composite materials molding method is a molding method, in which fiber sheets in a dry state are used, and vacuum assisted resin transfer molding (VaRTM), resin transfer molding (RTM), infusion molding, or the like is applicable thereto. In the following description, a case where the stringer 20 illustrated in FIG. 2 is molded will be explained. The stringer 20 may be integrally molded with a skin 19, which is the mounted member 5, and hereinafter, a case, in which the stringer 20 is integrally molded with the skin 19 that is composite materials having cured, will be described.

As illustrated in FIG. 3, in this molding method, a mold material 30 is set up for the laminate 3 that has been shaped. The mold material 30 has two split molds 31a and 31b that have been split from each other. The skin 19 also functions as a part of the mold material 30. That is, the mold material 30 is configured to include the two split molds 31a and 31b, and the skin 19. The two split molds 31a and 31b are molds made by use of, for example, aluminum. The laminate 3 that has been shaped is mounted on the skin 19 where the ply drop-off portion 6 is formed, and the two split molds 31a and 31b are pressed thereagainst from thereabove so as to sandwich the laminate 3 from both sides thereof.

Further, this mold material 30 is covered by a bagging film 32. By the bagging film 32 covering the two split molds 31a and 31b and a sealing material 33 being provided between the bagging film 32 and the skin 19, the interior thereof is sealed airtightly. The interior of the bagging film 32 that has been sealed airtightly is filled with a resin material, heating is carried out by a heating apparatus not illustrated, and thereby the resin material thermally cures and the stringer 20 is molded.

Next, by reference to FIG. 4 and FIG. 5, the mold material 30 will be described. FIG. 4 and FIG. 5 are side views of FIG. 2 as viewed in the X-direction. The mold material 30 has a first inclination molding surface 41 that forms the first inclined surface 21 on the stringer 20 that has cured and that is to be molded, and a second inclination molding surface 42 that forms the second inclined surface 22 thereon. The first inclination molding surface 41 realizes molding such that an angle of inclination of the first inclined surface 21 molded on the stringer 20 equals the first inclination angle θ1. The second inclination molding surface 42 realized molding such that an angle of inclination of the second inclined surface 22 molded on the stringer 20 equals the second inclination angle θ2 smaller than the first inclination angle θ1.

A plate thickness of the stringer 20 molded by use of this mold material 30, the plate thickness being at an inclined part where the first inclined surface 21 is formed, is thicker than a plate thickness of an adjacent part adjacent to the inclined part at both sides of the inclined part. Therefore, a regions E1, in which the inclined part is formed, is a low Vf region low in fiber volume content, and a region E2, in which the adjacent part is formed, is a high Vf region high in fiber volume content. The fiber volume content (Vf) is a fraction of carbon fiber contained in the composite materials 1.

Further, when the stringer 20 is molded by use of this mold material 30, the stringer 20 is molded such that a plate thickness of the stringer 20 that has cured becomes thinner than a plate thickness of the stringer 20 that has been shaped (that has not cured). In order for the plate thickness of the stringer 20 to be reduced, excessive resin material filled in the laminate 3 is discharged outside. The stringer 20 is molded by the discharge of the resin material outside such that an increase in the fiber volume content of the stringer 20 that has cured is equal to or less than 20% of the fiber volume content of the stringer 20 that has been formed (that has not cured), and more preferably, the stringer 20 is molded such that the increase is about 5% to 10% thereof.

Next, by reference to FIG. 5, operation related to the composite materials molding method, by which the composite materials 1, such as the stringer 20, are molded by use of the above described mold material 30, will be described.

Firstly, a shaping process (Step S1), in which the laminate 3 is formed by lamination of plural carbon fiber sheets in a dry state over one another, and this laminate 3 is shaped by being bent in the X-direction and Y-direction, is carried out. FIG. 5 illustrates only the laminate 3 around the first inclined surface 21, which is a side view of FIG. 2 as viewed in the X-direction, and thus the laminate 3 is flat in the Z-direction.

The laminate 3 that has been shaped in the shaping process S1 is mounted on the skin 19 serving as the mold material 30, and the two split molds 31a and 31b are mounted from thereabove (Step S2). Therefore, the laminate 3 is deformed in the Z-direction by the two split molds 31a and 31b. Thereafter, by the laminate 3 being covered, together with the mold material 30, by the bagging film 32, the interior of the mold material 30 is brought into an airtight state.

After execution of Step S2, while the amount of resin material filled in is adjusted, resin is filled into the laminate 3. The resin material may be filled while the interior of the mold material 30 is subjected to vacuum drawing, or may be filled while pressure is applied thereto, and the method, by which the resin material is filled in, is not particularly limited. Further, with the filling of the resin material; the mold material 30 is pressurized such that the laminate 3 is sandwiched therein, and is heated up by the heating apparatus not illustrated (molding process: Step S3).

In the composite materials 1 that have thermally cured in the molding process S3, the first inclined surface 21 having the first inclination angle θ1 is formed and the second inclined surface 22 having the second inclination angle θ2 is formed, by the first inclination molding surface 41 and the second inclination molding surface 42 of the mold material 30 (Step S4). The composite materials 1 that have cured have the low Vf region E1 in the inclined part and the high Vf region E2 in the adjacent part.

As described above, according to this embodiment, even when the laminate 3 is bent three-dimensionally, by molding being carried out such that the first inclined surface 11 or 21 and the second inclined surface 12 or 22 are formed in the composite materials 1 that have cured, generation of wrinkles is able to be reduced. That is, by the second inclination molding surface 42 of the mold material 30 being an inclined surface that is more moderate than the first inclination molding surface 41, wrinkles according to the second inclined surface 12 or 22 are formed. Since the wrinkles formed according to the second inclined surface 12 or 22 are smaller than wrinkles formed according to the first inclined surface 11 or 21, generation of wrinkles is able to be reduced. As the generation of wrinkles is able to be reduced, restriction on shape of the composite materials 1 is mitigated, and for example, the first inclination angle θ1 of the first inclined surface 11 or 21 is able to be made an angle larger than that done conventionally. Specifically, when a conventional first inclination angle θ1 is compared to the first inclination angle θ1 of this embodiment, the first inclination angle θ1 of this embodiment is able to be made an angle that is about four times as large as the conventional first inclination angle θ1. Therefore, freedom of design of the composite materials 1 is able to be increased.

Further, according to this embodiment, since the laminate 3 is formed by use of the carbon fiber sheets in the dry state, a state where interlayer slippage in the laminate 3 easily occurs is able to be achieved. Therefore, since a structure easily allowing displacement of the laminate 3 that is bent three-dimensionally is able to be made, generation of wrinkles is able to be reduced even more.

Further, according to this embodiment, since the fiber volume content of the inclined part is less than the fiber volume content of the adjacent part that is a part adjacent to the inclined part, molding is able to be achieved with the plate thickness of the inclined part being made thicker than the plate thickness of the adjacent part.

Further, according to this embodiment, by discharge of the excessive resin material filled into the laminate 3 outside, the plate thickness of the composite materials that have cured is able to be made thinner than the plate thickness of the composite materials 1 that have not cured. Therefore, by adjustment of the amount of the resin material filled in, the first inclined surface 11 or 21 and the second inclined surface 12 or 22 of the composite materials 1 are able to be molded, and thus molding of the composite materials 1 by use of the mold material 30 is able to be carried out accurately.

Further, according to this embodiment, by the composite materials 1 being molded such that the increase in the fiber volume content becomes equal to or less than 20%, reduction in strength of the composite materials 1 is able to be lessened, and the first inclined surface 11 or 21 and the second inclined surface 12 or 22 are able to be molded in the composite materials 1.

In this embodiment, the laminate 3 is formed by use of the carbon fiber sheets in the dry state, but not being limited to carbon fiber: the fiber sheets may be fiber sheets of another material, such as glass fiber or aramid fiber; or a prepreg formed by impregnation of resin into fiber sheets beforehand may be used. In this case, in the molding process, preferably, more of the resin material is filled in, and the amount of filling is adjusted by discharge of the resin material at the time of molding. Further, in this embodiment, the split molds 31a and 31b are formed by use of aluminum, but metal, such as Invar, may be used. Furthermore, the mold material 30 is not particularly limited, as long as the mold material 30 is a mold material that enables molding such that in molding of the composite materials 1, the shape of the composite materials 1 after the molding is a designed shape that has been designed beforehand.

Figure 6:
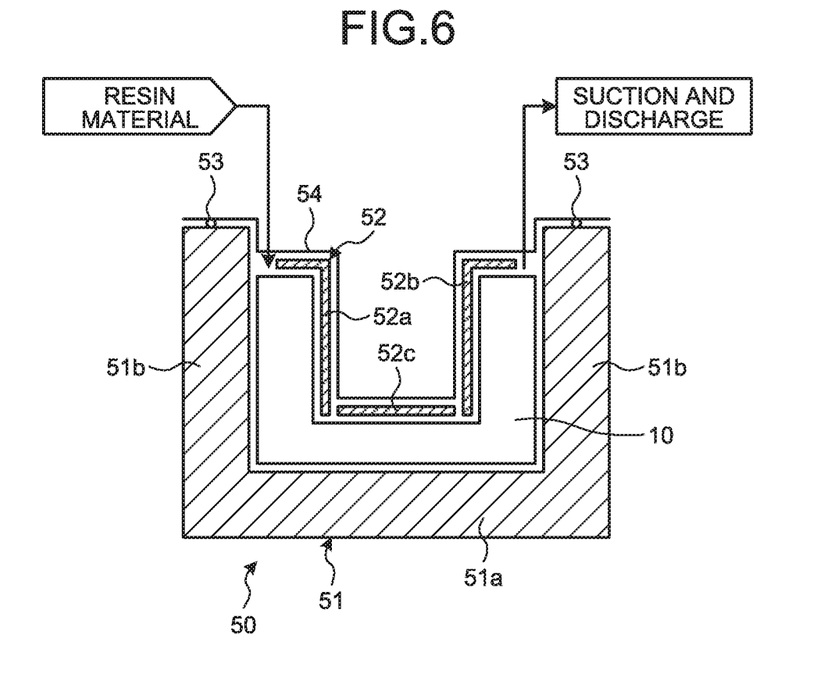
FIG. 6 is an explanatory diagram related to a composite materials molding method according to a modification of the embodiment.

Further, in this embodiment, the composite materials 1 that are the stringer 20 are molded by use of the mold material 30, but the composite materials 1 that are the spar 10 may be molded by use of a mold material 50 illustrated by a modification in FIG. 6. FIG. 6 is an explanatory diagram related to a composite materials molding method according to a modification of the embodiment. The mold material 50 illustrated in FIG. 6 is a mold material that is used for the spar 10, which is the composite materials 1 and is illustrated in FIG. 1, to be molded, and has a lower mold 51 and an upper mold 52. The spar 10 is pressed so as to be sandwiched between the lower mold 51 and the upper mold 52.

The lower mold 51 is a mold that is provided at a lower side of the spar 10 in a vertical direction. In the lower mold 51, a U-shaped cross section is formed by a bottom portion 51a and both side portions 51b extending upward from both sides of the bottom portion 51a, and an interior space that is able to accommodate therein the spar 10 is formed therein. In this interior space, the spar 10 that has not cured and that has been shaped with the U-shaped cross section is arranged so as to overlap with the lower mold 51. An inner surface (a surface that receives the interior space) of the lower mold 51 is formed on the same plane as a joint surface of a skin, to which the spar 10 is joined. That is, the first inclination molding surface 41 that forms the first inclined surface 11 on the spar 10 that has cured and that is to be molded is formed on the inner surface of the lower mold 51. Accordingly, by the lower mold 51, the first inclined surface 11 is formed on the spar 10 that has cured.

The upper mold 52 is a mold that is provided at an upper side of the spar 10 in the vertical direction. The upper mold 52 has three split molds 52a, 52b, and 52c that have been split. The three split molds 52a, 52b, and 52c are pressed against an inner side of the spar 10 that has not cured and that has been accommodated in the interior space of the lower mold 51. The three split molds 52a, 52b, and 52c are arranged such that a cross section thereof is U-shaped, by: the split mold 52c being arranged at a bottom portion of the spar 10, which is accommodated in the lower mold 51 and has the U-shaped cross section; and two of the split molds 52a and 52b being arranged to extend upward from both sides of the split mold 52c. The second inclination molding surface 42, which forms the second inclined surface 12 on the spar 10 that has cured and that is to be molded, is formed on the upper mold 52. Accordingly, by the upper mold 52, the second inclined surface 12 is formed on the spar 10 that has cured.

Further, this mold material 50 is covered by a bagging film 54. By the bagging film 54 covering the three split molds 52a, 52b, and 52c and a sealing material 53 being provided between the bagging film 54 and the lower mold 51, the interior thereof is sealed airtightly. The interior of the bagging film 54 that has been sealed airtightly is filled with a resin material, heating is carried out by a heating apparatus not illustrated, and thereby the resin material thermally cures and the spar 10 is molded.

Since a molding method for the spar 10 by use of the mold material 50 is similar to the molding method for the stringer 20, description thereof will be omitted.

REFERENCE SIGNS LIST

1 COMPOSITE MATERIALS
3 LAMINATE
5 MOUNTED MEMBER
6 PLY DROP-OFF PORTION
10 SPAR
11 FIRST INCLINED SURFACE OF SPAR
12 SECOND INCLINED SURFACE OF SPAR
19 SKIN
20 STRINGER
21 FIRST INCLINED SURFACE OF STRINGER
22 SECOND INCLINED SURFACE OF STRINGER
30 MOLD MATERIAL
31a, 31b SPLIT MOLD
32 BAGGING FILM
33 SEALING MATERIAL
41 FIRST INCLINATION MOLDING SURFACE
42 SECOND INCLINATION MOLDING SURFACE
50 MOLD MATERIAL
51 LOWER MOLD
51a BOTTOM PORTION
51b BOTH SIDE PORTIONS
52 UPPER MOLD
52a, 52b, 52c SPLIT MOLD
53 SEALING MATERIAL
54 BAGGING FILM
E1 LOW Vf REGION
E2 HIGH Vf REGION

The invention claimed is:

1. A method of molding a composite materials to be joined to a skin having a panel shape inclined at a first inclination angle with respect to an XZ plane from a Z-axis in a Y-direction in a three-dimensional orthogonal coordinate system, the method comprising:
a shaping process of shaping a laminate having fiber sheets laminated over one another, by bending the laminate in an X-direction and the Y-direction such that a cross sectional shape of the laminate becomes the same along a Z-direction; and
a molding process of: mounting the laminate that has been shaped, onto a mold material having a change in shape from the Z-axis in the Y-direction; impregnating a resin material into the laminate while adjusting an amount of the resin material filled therein; and molding the composite materials that have not cured into a shape having a first inclined surface inclined at the first inclination angle with respect to the XZ plane from the Z-axis in the Y-direction, such that the composite materials that have cured have the panel shape of the skin, wherein
the mold material has a first inclination molding surface that molds the first inclined surface and serves as a joint surface to the skin, and a second inclination molding surface that molds a surface of the composite materials, the surface being opposite to the first inclined surface, into a second inclined surface having a second inclination angle smaller than the first inclination angle, and
the difference between the first inclination angle and the second inclination angle is substantially constant.

2. The method of molding the composite materials, according to claim 1, wherein the fiber sheets are in a dry state.

3. The method of molding the composite materials, according to claim 1, wherein in the molding process, a fiber volume content of an inclined part that is a part where the first inclined surface is formed is smaller than a fiber volume content of an adjacent part that is a part adjacent to the inclined part.

4. The method of molding the composite materials, according to claim 1, wherein in the molding process, the composite materials are molded, such that a plate thickness of the composite materials that have cured becomes thinner than a plate thickness of the composite materials that have not cured.

5. The method of molding the composite materials, according to claim 4, wherein in the molding process, the composite materials are molded, such that an increase in fiber volume content of the composite materials that have cured is equal to or less than 20% of a fiber volume content of the composite materials that have not cured.

* * * * *